United States Patent Office 3,493,588
Patented Feb. 3, 1970

3,493,588
PROCESS FOR THE PREPARATION OF 6-CHLORO-16-METHYLENE-17α-LOWER ALKANOYLOXY-4,6-PREGNADIENE-3,20-DIONE AND NOVEL INTERMEDIATES PRODUCED THEREBY
Herschel L. Herzog, Glen Ridge, Elliot L. Shapiro, Cedar Grove, and Lois Weber, Springfield, N.J., assignors to Schering Corporation, Bloomfield, N.J., a corporation of New Jersey
No Drawing. Filed Mar. 25, 1968, Ser. No. 715,534
Int. Cl. C07c 167/00
U.S. Cl. 260—397.4    11 Claims

ABSTRACT OF THE DISCLOSURE 6-halogeno-16-methylene-17α-alkanoyloxy-4,6-pregnadiene-3,20-diones (progestational agents) are prepared by reacting 6α,7α;16α,17α-bis-oxido-16β-methyl-4-pregnene-3,20-dione with hydrogen halide; esterifying the thereby formed 6β-halogeno-7α,17α-dihydroxy-16-methylene-4-pregnene-3,20-dione with a lower alkanoic acid and an acid anhydride under acidic conditions; and treating the thereby formed 6β-halogeno-7α,17α-dilower alkanoyloxy-4-pregnene-3,20-dione with hydrogen halide.

FIELD OF INVENTION

This invention relates to a process for producing compositions of matter classified in the field of chemistry as 6-halogeno-16-methylene-17α-lower alkanoyloxy-4,6-pregnadiene-3,20-dione (e.g. 6-chloro-16-methylene-17α-lower alkanoyloxy-6-dehydroprogesterones) which are known, valuable progestational agents, and to novel intermediates produced thereby.

More specifically, this invention relates to a process whereby 6α,7α;16α,17α-bis-oxido-16β-methyl-4-pregnene-3,20-dione (6α,7α;16α,17α-bis-oxido-16β-methylprogesterone) is converted to 6-chloro-16-methylene-17α-lower alkanoyloxy-4,6-pregnadiene-3,20-dione (and preferably to 6-chloro-16-methylene-17α-acetoxy-4,6-pregnadiene-3,20-dione) of high purity via a series of three reaction steps of good yields, and to the novel intermediates produced thereby, i.e. 6β-chloro-7α,17α-dihydroxy-16-methylene-4-pregnene-3,20-dione and 7α,17α-di-lower alkanoate thereof (preferably 6β-chloro-7α,17α-diacetoxy-16-methylene-4-pregnene-3,20-dione).

DESCRIPTION OF THE PRIOR ART

The 6-halogeno-16-methylene-17α-lower alkanoyloxy-4,6-pregnadiene-3,20-dione compositions of matter prepared by the process of this invention are a known class of compounds valuable as oral progestational agents which are described and claimed in U.S. Patent No. 3,312,692.

Of this class of compounds, a preferred species is 6-chloro-16-methylene-17α-acetoxy-4,6-pregnadiene-3,20-dione (i.e. 6-chloro-16-methylene-17α-acetoxy-6-dehydroprogesterone) which (as reported by Z. Cekan et al., Steroids 8:2, 205–207 (1966)) when tested in the rabbit via a modified McPhail test, exhibits at least twice the progestational activity of the 16-desmethylene analog, 6-chloro-17α-acetoxy-4,6-pregnadiene-3,20-dione, which is marketed as a progestational agent under the generic name, chlormadinone. This compound, i.e. 6-chloro-16-methylene-17α-acetoxy-4,6-pregnadiene-3,20-dione, is also valuable as an anti-androgen, particularly in the treatment of benign prostatic hypertrophy, as disclosed in copending application Ser. No. 715,533 of Herzog et al., filed simultaneously herewith.

Described in the literature are several methods of preparing 6-chloro-16-methylene-17α-alkanoyloxy-4,6-pregnadiene-3,20-diones from 6-unsubstituted-16β-methyl-16α,17α-oxidopregnene starting derivatives.

Thus, in U.S. Patent No. 3,312,692 (see Examples 1A, 1B, 2, 16(B–D) and 46 therein) 16-methyl-16-dehydropregnenolone (i.e. 16-methyl-5,16-pregnadiene-3β-ol-20-one) is converted to 6-chloro-16-methylene-17α-acetoxy-6-dehydroprogesterone (i.e. 6-chloro-16-methylene-17α-acetoxy-4,6-pregnadiene-3,20-dione) via a series of reactions such as shown diagrammatically below:

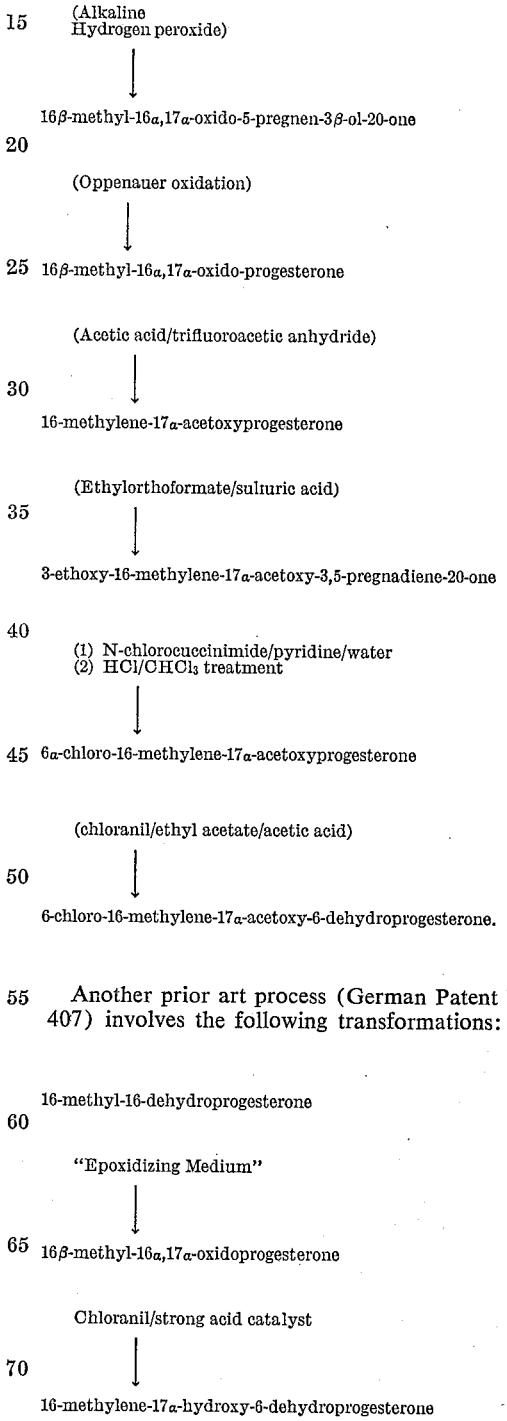

Another prior art process (German Patent No. 1,156,407) involves the following transformations:

16-methyl-16-dehydroprogesterone

"Epoxidizing Medium"

16β-methyl-16α,17α-oxidoprogesterone

Chloranil/strong acid catalyst 16-methylene-17α-hydroxy-6-dehydroprogesterone

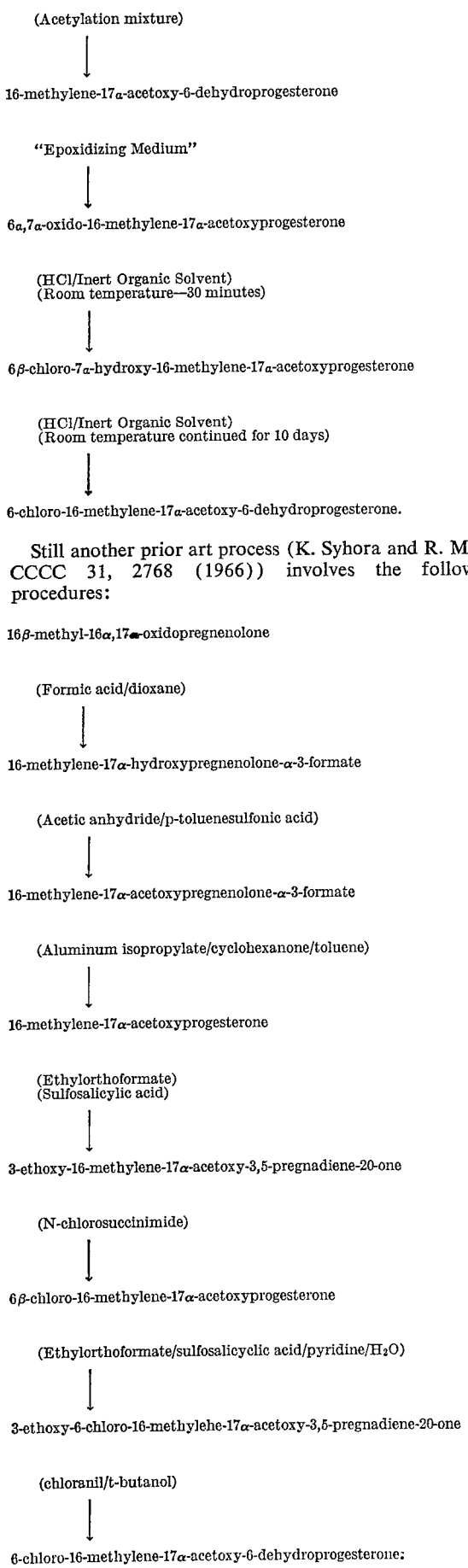

Still another prior art process (K. Syhora and R. Maza, CCCC 31, 2768 (1966)) involves the following procedures:

It is readily apparent that, when using the above prior art processes, it is necessary to go through several reaction steps in order to convert a 6-unsubstituted-16β-methyl-16α,17α-oxido-pregnene starting compound to a derivative containing the requisite moieties at C-6 (i.e. 6-chloro) and at C-16,17 (i.e. the 16-methylene-17α-lower alkanoyloxy system) which are present in the orally active progestational agents, 6-chloro-16-methylene-17α-lower alkanoyloxy-6-dehydroprogesterone. By the process aspect of this invention, it is now possible to introduce both the 6-chloro group and the 16-methylene-17α-alkanoyloxy-system in but two reaction steps, thus making it possible by our process to effect the complete conversion of 6α,7α;16α,17α - bis - oxido - 16β - methyl - 4 - pregnene-3,20-dione to 6-chloro-16-methylene-17α-acetoxy-4,6-pregnadiene-3,20-dione in but three reaction steps resulting in a high yield of pure product, thus making our process the method of choice when preparing 6-chloro-16-methylene-17α-acetoxy-4,6-pregnadiene-3,20-dione from a 6-unsubstituted-16β-methyl-16α,17α-oxido-pregnene intermediate.

In addition to the foregoing, in effecting the transformations disclosed hereinabove, the prior art methods all include a step involving the dehydrogenation of a 6,7-saturated compound to the corresponding 6-dehydro analog by the action of chloranil.

It is well known in the art that product yields are poor in reactions involving chloranil dehydrogenation at C-6 and C-7. It is also well known in the art that chloranil dehydrogenation procedures are undesirable for use in commercial processes since any excess chloranil present is difficult to remove and results in the formation of highly colored transformation products. Additionally, in order to eliminate the chloranil reduced transformation product (i.e. dihydroquinone) the chloranil reaction mixtures are subjected to washings with an alkaline solution which can result in the saponification of ester groups present such as the 17α-lower alkanoate group present in the compounds being prepared by our process.

The process of this invention advantageously eliminates the necessity of including a chloranil dehydrogenation step in the conversion of pregnenolone or progesterone to 6-chloro-16-methylene-17α-acetoxy-6-dehydroprogesterone.

In addition to the foregoing, the last two steps of our process wherein 6β-chloro-7α-hydroxy-16-methylene-17α-hydroxy-4-pregnene-3,20-dione is converted to 6β-chloro-7α - acetoxy - 16 - methylene - 17α - acetoxy - 4 - pregnene-3,20-dione in good yields followed by deacetoxylation thereof by the action of anhydrous hydrogen chloride in a non-reactive solvent, in excellent yields (almost 90% theory) with both steps being completed within 24 to 30 hours, represents an improvement over the prior art method of preparing 6-chloro-16-methylene-17α-acetoxy-4,6-pregnadiene-3,20-dione by dehydration of the 6β-chloro-7α-hydroxy precursor, i.e. 6β-chloro-7α-hydroxy-16-methylene-17α-acetoxy-4-pregnene-3,20-dione by the action of aqueous hydrochloric acid in dioxane and acetic acid, which prior art method requires ten days reaction time (German Patent No. 1,156,407).

In summary, the process of this invention represents an advance in the art since by means of our process it is now possible to convert a 16β-methyl-16α,17α-oxido-4-pregnene (i.e. 6α,7α;16α,17α-bis-oxido-16β-methyl-4-pregnene-3,20-dione) to 6-chloro-16-methylene-17α-acetoxy-6-dehydroprogesterone involving the introduction of both a 6-chloro-substitute and a 16-methylene-17α-acetoxy-system in but three steps of high yields of pure crystalline products, whereas prior art processes required from five to seven steps to effect a similar conversion of which at least one (i.e. the chloranil dehydrogenation step) results in poor yields of a product difficult to purify. Additionally, by our process it is now possible to effect the conversion of 6β-chloro-7α-hydroxy-16-methylene-17α-hydroxy-4-pregnene-3,20-dione to pure 6-chloro-16-methylene-17α-acetoxy-4,6-pregnadiene-3,20-dione via deacetoxylation of the 7α,17α-dilower alkanoate ester thereof in

SUMMARY OF THE INVENTION

Process aspect

The invention sought to be patented in its process aspect resides in the concept of a process for preparing a valuable class of progestational compounds known in the field of chemistry as 6-chloro-16-methylene-17α-lower alkanoyloxy-4,6-pregnadiene-3,20-diones (and preferably 6-chloro-16 - methylene - 17α - acetoxy - 4,6 - pregnadiene - 3,20-dione) from 6α,7α;16α,17α-bis-oxido-16β-methyl-4-pregnene-3,20-dione, said process comprising:

Reacting 6α,7α;16α,17α - bis - oxido - 16β - methyl - 4-pregnene-3,20-dione with hydrogen chloride in a non-reactive organic solvent; reacting the thereby formed 6β-chloro - 7α,17α - dihydroxy - 16 - methylene - 4 - pregnene-3,20-dione with a lower alkanoic acid and an acid anhydride under acidic conditions; and reacting the thereby formed 6β-chloro-7α,17α-dilower alkanoyloxy-16-methylene-4-pregnene-3,20-dione with anhydrous hydrogen chloride in a non-reactive organic solvent.

Our process provides a preferred method for preparing 6-chloro-16-methylene-17α-lower alkanoyloxy-6-dehydroprogesterone in that there is thereby produced high yields of pure product in fewer reaction steps and in a greatly reduced reaction time over that of prior art processes.

A preferred species of the process aspect is that wherein the lower alkanoic acid is acetic acid whereby is prepared 6 - chloro-16-methylene-17α-acetoxy-6-dehydroprogesterone, a known, potent progestational agent.

Product aspects

The invention sought to be patented in its product aspects resides in the concept of novel intermediates prepared by, and useful in, the process aspect of this invention, namely 6β-chloro-7α,17α-dihydroxy-16-methylene-4-pregnene-3,20-dione and the 7α,17α-dilower alkanoate esters thereof, a preferred species being 6β-chloro-7α,17α-diacetoxy-16-methylene-4-pregnene-3,20-dione, the requisite intermediate in the preparation of 6-chloro-16-methylene-17α-acetoxy-4,6-pregnadiene-3,20-dione.

We have discovered that surprisingly and advantageously, 6β - chloro-7α,17α-diacetoxy-16-methylene-4-pregnene-3,20-dione upon treatment with hydrogen chloride according to our process will deacetoxylate readily at C-7 (sometimes in as little as four hours) to produce directly and in excellent yields (almost 90% theory after crystallization) the known, valuable oral progestational agent 6-chloro - 16 - methylene-17α-acetoxy-4,6-pregnadiene-3,20-dione. This is surprising since we have also discovered that under the same reaction conditions, the 7α,17α-dihydroxy precursor dehydroxylates at C-7 with great difficulty, there remaining unchanged, after nineteen hours reaction time, over 50% of the 7α,17α-dihydroxy starting steroid, and there being obtained less than 5% theoretical yield of the desired 6-dehydro product. Thus, 6β-chloro-7α,17α-diacetoxy-16-methylene-4-pregnene-3,20-dione is a necessary intermediate in our process. The 7α,17α-diacetoxy derivative of our invention is also vastly superior as an intermediate over the known 7α-hydroxy-17α-acetoxy analog, i.e. 6β-chloro-7α-hydroxy-16-methylene-17α-acetoxy-4-pregnene-3,20-dione which, according to the prior art, also dehydrates at C-7 with difficulty, requiring ten days to produce the desired 6-chloro-16-methylene-17α-acetoxy-4,6-pregnadiene-3,20-dione.

GENERAL DESCRIPTION OF THE INVENTION

As used herein, the terms "lower alkanoyloxy," "lower alkanoic acids," and "lower alkanoate" relate to saturated, unsaturated, branched, and cyclic hydrocarbon carboxylic acids having up to eight carbon atoms including formic, acetic, propionic, n-butyric, tert.-butyric, valeric, cyclopentylpropionic, cyclohexylacetic, caproic, valeric, caprylic, propiolic, and tetrolic acids.

In discussing herein the manner of carrying out the physical embodiment of the concept of the process and product aspects of this invention, reference will be specifically made to the preferred mode of our invention, i.e. the process of preparing the 17α-acetate ester compound, 6-chloro - 16 - methylene-17α-acetoxy-4,6-pregnadiene-3,20-dione, and the novel intermediates produced thereby. It is understood that our process will prepare other 17-lower alkanoate ester compound, i.e. 6-chloro-16 - methylene - 17α - lower alkanoyloxy - 4,6 - pregnadiene-3,20-dione, simply by utilizing alkanoic acids other than acetic acid in our process.

Process aspect

The manner of carrying out the tangible embodiment of the process aspect of this invention is generally described hereinbelow so as to enable one skilled in the art to make and use the same.

According to our process, 6α,7α;16α,17α-bis-oxido-16β-methyl-4-pregnene-3,20-dione is treated with hydrogen chloride in a non-reactive organic solvent whereby the epoxy functions at both C-6, 7 and C-16, 17 are split and there is simultaneously introduced into the molecule a 6β-chloro-7α-hydroxy-system and a 16-methylene-17α-hydroxy-system to form 6β-chloro-7α,17α-dihydroxy-16-methylene-4-pregnene-3,20-dione, a novel intermediate of this invention. The 7α,17α-dihydroxy functions of the foregoing compound are then esterified by means of a lower alkanoic acid and an acid anhydride under acidic conditions to yield the corresponding 7,17-dilower alkanoate ester thereof, another novel intermediate of the product aspects of our invention. Treatment of the 6β-chloro-7α,17α-dilower alkanoyloxy - 16 - methylene-4-pregnene-3,20-dione with anhydrous hydrogen chloride in a non-reactive organic solvent yields the known progestational agents, 6-chloro-16-methylene-17α-lower alkanoyloxy-4,6-pregnadiene-3,20-dione.

The starting compound for our process is conveniently prepared from 16-methyl-4,6,16-pregnatriene-3,20-dione according to procedures described and claimed in Herzog et al. copending application Ser. No. 715,533, filed simultaneously herewith entitled "6α,7α; 16α,17α-Bis-Oxido-16β-Methyl-4-Pregnene-3,20-Dione and Method for its Manufacture." For example, when 16-methyl-4,6,16-pregnatriene-3,20 - dione in refluxing tertiary butanol is treated with from 4 to 5 moles of m-chloroperbenzoic acid and the reaction mixture is heated at reflux temperature for about 2 hours there is obtained 6α,7α;16α17β-bis-oxido-16β-methyl-4-pregnene-3,20-dione. Alternatively, 16-methyl-4,6,16-pregnatriene-3,20-dione is reacted with alkaline hydrogen peroxide according to known techniques and the 16β-methyl - 16α,17α - oxido - 4,6 - pregadiene-3,20-dione thereby formed is then treated with m-chloroperbenzoic acid to obtain 6α,7α;16α,17α-bis-oxido-16β-methyl-4-pregnene-3,20-dione, the starting compound for the process of this invention.

By non-reactive organic solvents are meant organic solvents which will not react with hydrogen chloride or the steroid substrate under the conditions of the reaction so as to cause transformations which would result in the occurrence of competing side reactions. Contemplated as included among the inert organic solvents for use in both the first and last steps of our process are acetic acid, dioxane, benzene, ethyl acetate, chloroform, and mixtures thereof. Of the foregoing, we have found that glacial acetic acid is the solvent of choice when carrying out the first (epoxide splitting) step of our process, and that chloroform is the solvent of choice when carrying out the last (deacetoxylation) step of our process.

When carrying out the physical embodiment of the process aspect of our invention, the first (epoxide splitting) step is preferably carried out in glacial acetic acid. We have also found that when at least a two mole excess of hydrogen chloride in acetic acid is added to 6α,7α;16α,17α-bis-oxido - 16β-methyl - 4-pregnene - 3,20-dione and the mixture allowed to stand at room temperature for six hours, there is obtained excellent yields (i.e. almost 90% theory) of 6β-chloro-7α,17α-dihydroxy-16-methylene - 4 - pregnene - 3,20-dione. Isolation of this product is conveniently effected by filtration and washing thereof with 50% acetic acid. The product thus isolated is of high purity (M.P. 250° C.) and can be used as is in the next step of our process.

This first (i.e. epoxide splitting) step of the process sought to be patented per se represents an advance in the art in that it possesses the advantageous features of not only introducing in one step both the 6β-chloro-7α-hydroxy- and the 16-methylene-17α-hydroxy-moieties (which heretofore have never been simultaneously introduced) to form the novel intermediate, 6β-chloro-7α,17α-dihydroxy - 16-methylene - 4-pregnene - 3,20-dione, but also producing a product of such high purity, it can be used as isolated from the reaction mixture as starting compound in the next step of our process.

In the esterification step of our process, the hydroxy functions at both C-7 and C-17 are esterified under acidic esterifying conditions via techniques known in the art such as those utilizing lower alkanoic acids in the presence of an acid anhydride such as an alkanoic acid anhydride and a lower halogenoalkanoic acid anhydride under acidic conditions via utilization of acid catalysts such as perchloric acid, sulfuric acid, and the like. We have found it convenient to use reagent mixtures such as a lower alkanoic acid anhydride and p-toluenesulfonic acid in a lower alkanoic acid (e.g. acetic anhydride and p-toluenesulfonic acid in acetic acid) and the reagent mixture comprising a lower alkanoic acid (preferably acetic acid) in the presence of p-toluenesulfonic acid and trifluoroacetic anhydride. With the lower alkanoic acid, e.g. acetic acid, present in great excess, esterification is usually complete within a few hours (about 3 to 4 hours). Isolation and purification via standard techniques such as set forth in Example 5 produces the diacetate ester, i.e. 6β-chloro - 7α,17α-diacetoxy - 16-methylene - 4-pregnene-3,20-dione, in high purity and excellent yields (about 65%).

The foregoing diacetate ester is a novel compound of our invention being valuable as an intermediate in the preparation of the corresponding 6-chloro-6-dehydro analog.

The last step of our process comprises treating 6β-chloro - 7α,17α-diacetoxy - 16-methylene - 4-pregnene-3,20-dione with anhydrous hydrogen chloride in a non-reactive organic solvent whereby deacetoxylation occurs and there is formed the corresponding 6-chloro-16-methylene-17α-acetoxy-4,6-pregadiene-3,20-dione. In a preferred method of carrying out the physical embodiment of the last step of our process, anhydrous hydrogen chloride is bubbled through a solution of 6β-chloro-7α,17α-diacetoxy - 16-methylene - 4-pregnene - 3,20-dione in chloroform at room temperature for one hour, and the reaction mixture is then stirred at room temperature until deacetoxylation is complete as determined by thin layer chromatography and spectroscopic analysis of aliquots of the reaction mixture. When carried out in this preferred manner, deacetoxylation is complete in less than a day, sometimes in as little as four hours, and there is isolated via standard techniques over 80% (e.g. 85% theory—Example 6) of 6-chloro-16-methylene-17α-acetoxy-4,6-pregnadiene-3,20-dione.

PREFERRED EMBODIMENT OF THE PROCESS ASPECT OF THIS INVENTION

In a preferred embodiment of the process aspect of this invention, the non-reactive organic solvent used in the first (epoxide splitting) step is glacial acetic acid, and the non-reactive organic solvent in the last (deacetoxylation) step is chloroform, and the esterification step is carried out with acetic acid in the presence of p-toluenesulfonic acid and trifluoroacetic anhydride. Under these preferred conditions there is obtained about 40–50% overall theoretical yield of pure 6-chloro-16-methylene - 17α-acetoxy - 4,6-pregnadiene - 3,20-dione from the starting bis-oxido-compound, 6α,7α;16α,17α-bis-oxido-4-pregnene-3,20-dione.

PREFERRED EMBODIMENT OF THE COMPOSITION OF MATTER ASPECT

The tangible embodiments of the composition-of-matter aspects of this invention, i.e. 6β-chloro-7α,17α-dihydroxy-4-pregnene-3,20-dione and the 7α,17α-dilower alkanoates thereof (in particular, the 7α,17α-diacetate ester thereof) possess the physical characteristics of being white, crystalline solids essentially insoluble in water and with limited solubility in organic solvents such as methanol, dioxane, and pyridine. More particularly, the 7α,17α-dihydroxy compound is further characterized by having a melting point of about 250° C. dec., an optical rotation value $\alpha_D^{20}$ of about —59° C. (pyridine), whereas the 7α,17α-diacetoxy compound is further characterized by having a melting point of about 250° C. and an optical rotation of about —100.5° in a 1% dioxane solution.

The tangible embodiment of the 7α,17α-dihydroxy composition of matter aspect of this invention (i.e. 6β-chloro - 7α,17α-dihydroxy - 16-methylene - 4-pregnene-3,20-dione) possesses the inherent, applied use characteristic that upon treatment with a lower alkanoic acid and an acid anhydride in an acidic medium there is formed the corresponding 7α,17α-dilower alkanoyloxy compound (e.g. 6β-chloro - 7α,17α - diacetoxy - 16-methylene - 4-pregnene - 3,20-dione) which, in turn, possesses the inherent use characteristic that upon treatment with anhydrous hydrogen chloride in a non-reactive solvent, deacetoxylation occurs with ease at C-7 and there is formed the known progestational agents 6-chloro - 16-methylene - 17α-lower alkanoyloxy - 4,6-pregnadiene-3,20-dione (e.g. 6-chloro - 16-methylene-17α-acetoxy - 4, 6-pregnadiene-3,20-dione).

Our invention disclosed above is exemplified in the following examples which describe in detail the preferred embodiments of the process sought to be patented. Our inventive concept is not to be construed as limited by the disclosure herein, since it will be apparent to those skilled in the art that modifications of the described invention may be practiced without departing from the purpose or intent of this disclosure.

Thus, for example, instead of acetic acid, there may be used other lower alkanoic acids, e.g. valeric acid, in our process and there will be prepared the novel intermediate, 6β - chloro - 7α,17α-divaleroxy-16-methylene-4,6-pregnadiene-3,20-dione which upon treatment with anhydrous hydrogen chloride in chloroform yields 6-chloro-16-methylene-17α-valeroxy-4,6-pregnadiene-3,20-dione.

Additionally, by utilizing hydrogen bromide or hydrogen fluoride instead of hydrogen chloride in our process, there is obtained the 6-bromo- and the 6-fluoro-analogs of the 6-chloro compounds. Thus, treatment of 6α,7α;16α,17α-bis-oxido-16β-methyl-4-pregnene-3,20-dione with hydrogen bromide or hydrogen fluoride in a non-reactive organic solvent yields 6β - bromo - 7α,17α-dihydroxy-16-methylene-4-pregnene-3,20-dione and 6β-fluoro-7α,17α-dihydroxy - 16 - methylene - 4 - pregnene-3,20-dione, respectively. Esterification of each of the foregoing intermediates according to our process, such as by treatment with acetic acid in the presence of p-toluenesulfonic acid and trifluoroacetic anhydride, yields the corresponding 7α,17α-diacetate esters thereof which, upon treatment with hydrogen bromide or hydrogen fluoride, respectively, in a non-reactive organic solvent yields 6-bromo-16-methylene-17α-acetoxy-4,6-pregnadiene-3,20-dione and 6-fluoro-16 - methylene - 17α-acetoxy-4,6-pregnadiene-3,20-dione, respectively.

EXAMPLE 1

16-methyl-4,6,16-pregnatriene-3,20-dione

To a suspension of 31.5 g. of 16-methyl-5,16-pregnadien-3β-ol-20-one (M.P. 188° C.), 95 g. of lithium carbonate and 63 g. of lithium bromide in 450 ml. of dimethylformamide add, with stirring, over a 30 minute period, 30.8 g. of bromine dissolved in 200 ml. of dioxane. Stir the reaction mixture for two hours and fifteen minutes at 80° C. then cool to room temperature, filter and pour the filtrate into 6.5 liters of water containing 12 g. of sodium bicarbonate and 12 g. of sodium bisulfite. Filter the resultant precipitate comprising 16-methyl-4,6,16-pregnatriene-3,20-dione and dry at 60° C. Yield 28.8 g. Purify by crystallization from acetone-ethyl ether, M.P. 213–215° C. (sinters 209° C.); $\alpha_D$ +70.6° (dioxane);

$\lambda_{max.}^{methanol}$ 283 m$\mu$ $\epsilon$=25,100. Yield=18.7 g. (60.5% theory)

EXAMPLE 2

16β-methyl-16α,17α-oxido-4,6-pregnadiene-3,20-dione

To a solution of 500 g. of 16-methyl-4,6,16-pregnatriene-3,20-dione (M.P. 213–215° C.) dissolved in a mixture of 10 liters of methanol and 5.75 liters of methylene chloride, add 500 ml. of 30% aqueous hydrogen peroxide, 1.5 liters of distilled water and 400 ml. of 5 N aqueous sodium hydroxide. Stir the reaction mixture at 30° C. for 4 hours, pour into 10 liters of water, and extract with methylene chloride. Wash the combined extracts with water, then with aqueous sodium bisulfite and finally with water. Separate the organic layer, dry over magnesium sulfate and concentrate in vacuo until a crystalline slurry is obtained. Add ethyl ether to the slurry and cool. Filter and dry the resultant precipitate comprising 16β-methyl-16α,17α-oxido-4,6-pregnadiene-3,20-dione, M.P. 168° C. (sinter 157° C.); $\alpha_D$ +71.1° C. (1% dioxane);

$\lambda_{max.}^{methanol}$ 283 m$\mu$ $\epsilon$=23,180. Yield 432 g. (82% theory)

This product can be used without further purification in the following procedure of Example 3.

EXAMPLE 3

16β-methyl-6α,7α;16α,17α-bis-oxido-4-pregnene-3,20-dione (A) To a refluxing solution of 200 g. of 16β-methyl-16α,17α-oxido-4,6-pregnadiene-3,20-dione (M.P. 168° C.) in 1.5 liters of benzene, add over a half hour period a slurry of 250 g. of m-chloroperbenzoic acid in 1.25 liters of benzene. Heat the reaction mixture at reflux temperature for 2 hours longer, then cool at 30° C., dilute with ethyl ether and wash with 5% aqueous sodium hydroxide followed by several water washes. Separate the organic layer, dry over magnesium carbonate and concentrate in vacuo to a residue. Dissolve the residue in ethyl ether and allow this ether solution to stand at room temperature for about 17–20 hours until a heavy crystalline slurry is obtained. Filter and dry this crystalline slurry comprising 16β - methyl - 6α,7α;16α,17α - bis - oxido - 4 - pregnene-3,20-dione, M.P. 198° C.; $\alpha_D$ +82.4° (1% dioxane), $\lambda_{max.}^{methanol}$ 240 m$\mu$ $\epsilon$=14,800. Yield 112 g. (53.5% theory)

This product can be used without further purification in the following procedure of Example 4.

(B)(1) Alternatively, the compound of this example is prepared as follows. To a solution of 25 g. of 16-methyl-4,6,16-pregnatriene-3,20-dione (M.P. 213–215° C.) in 420 ml. of benzene add 49.0 g. of m-chloroperbenzoic acid. Heat the resulting solution at reflux temperature for 2 hours, cool to room temperature and add ethyl ether. Wash the ether solution with dilute sodium hydroxide followed by two water washes. Dry over magnesium sulfate and concentrate in vacuo to a residue comprising substantially 16β-methyl-6α,7α;16α,17α-bis-oxido - 4 - pregnene-3,20-dione. Purify by two recrystallizations from methylene chloride-ethyl ether, M.P. 198° C.

(2) Alternatively, the compound of this example is prepared as follows. To a solution of 20 g. of 16-methyl-4,6,16-pregnatriene-3,20-dione in 500 ml. of methylene chloride add 46 g. of m-chloroperbenzoic acid and heat the resulting solution at reflux temperature for 2.5 hours. Cool the reaction mixture to room temperature, then neutralize with dilute aqueous sodium hydroxide. Separate the organic layer, wash with water and concentrate to a residue comprising 16β-methyl-6α,7α;16α,17α-bis-oxido-4-pregnene-3,20-dione. Purify by recrystallization from methylene chloride-ethyl acetate.

(3) Alternatively, the compound of this example is prepared as follows. Heat a mixture of 4,6,16-pregnatriene-3,20-dione (5 g.) and tert.-butanol (25 ml.) to reflux temperature. While stirring the slurry, add 7.98 g. metachloroperbenzoic acid as a solid in 4 equal portions over a 15 minute period. After the addition is complete continue stirring the refluxing solution for 30 minutes. Cool to 40° and add 10% aqueous sodium sulfite until any excess peracid is decomposed as determined by testing with starch-iodide paper. Pour the mixture into approximately 80 ml. ice water, and add 50 ml. methylene chloride. Adjust the pH of the aqueous layer to pH 11 by addition of aqueous sodium hydroxide. Separate the organic layer and extract the aqueous layer with 20 ml. methylene chloride. Wash the combined extracts to neutrality with water and evaporate to a residue comprising 16β-methyl-6α,7α;16α,17α-bis-oxido-4-pregnene-3,20-dione. Purify by crystallization by dissolving in methylene chloride and replacing with ether to yield 2.8 gms. (53% theory) which can be used without further purification as an intermediate in a process such as described in Example 4.

EXAMPLE 4

6β-chloro-7α,17α-dihydroxy-16-methylene-4-pregnene-3,20-dione

To a solution of 1.2 g. of 6α,7α;16α,17α-bis-oxido-16β-methyl-4-pregnene-3,20-dione (M.P. 198° C.) in 21.6 ml. of acetic acid, add 7.2 ml. of an 8% solution of hydrogen chloride in glacial acetic acid (weight/volume). Allow the reaction mixture to stir at room temperature for 6 hours, then filter the resultant precipitate, wash with 50% acetic acid, then water and air dry to give 6β-chloro-7α,17α-dihydroxy-16-methylene-4-pregnene-3,20-dione, M.P. 250° C. dec.; $\alpha_D^{25}$ −59° C. (pyridine). Yield=1.15 g. (87.1% theory).

EXAMPLE 5

6β-chloro-7α,17α-diacetoxy-16-methylene-4-pregnene-3,20-dione (A) Suspend 70.0 g. of 6β-chloro-7α,17α-dihydroxy-16-methylene-4-pregnene-3,20-dione in 700 ml. glacial acetic acid, together with 7.0 g. p-toluenesulfonic acid hydrate. Cool to below 20° C., then rapidly add 250 ml. of trifluoroacetic anhydride maintaining the reaction temperature below 20° C. Allow the reaction mixture to warm to room temperature and to stir at room temperature for 3.5 hours. Add water to the reaction mixture, filter off the crude product and then wash it to neutrality with water. Dry the crude product and purify by recrystallization from ethyl acetate, filter and dry the resultant crystalline product comprising 6β-chloro-7α,17α-diacetoxy-16-methylene-4-pregnene-3,20-dione. M.P. 248–250° C. (sinters 225° C); $\alpha_D^{25}$ −100.5° (dioxane);

$\lambda_{max.}^{methanol}$ 238 m$\mu$ $\epsilon$=14,650

Yield=55.2 g. (65.4% theory).

(B) Alternatively the compound of this example is also prepared as follows. Suspend 68.5 g. of 6β-chloro-16-methylene-7α,17α-dihydroxy-4-pregnene-3,20-dione in 685 ml. of glacial acetic acid together with 6.8 g. p-toluenesulfonic acid monohydrate. Cool the mixture to 20° C., then slowly add 274 ml. of acetic anhydride over a one-hour period. Warm the reaction mixture to 40° C. and allow it to stand for 18 hours. Pour the reaction mixture into 18 liters of water at 50° C. and agitate for 2 hours. Filter off the product, wash it to neutrality with cold water and dry the crude product at 60° C. The crude diacetate, 73.4 g., may be crystallized from ethyl acetate to give purified 6$\beta$-chloro-16-methylene-7$\alpha$,17$\alpha$-diacetoxy-4-pregnene-3,20-dione, 39.9 g.

[M.P. 239–240° C.; $\alpha$] = −100.6° (dioxane); $\lambda_{max.}^{MeOH}$ 238 m$\mu$ $\epsilon$ = 14,650, yield 40 g. (48.5% theory)]

EXAMPLE 6

6-chloro-16-methylene-17$\alpha$-acetoxy-4,6-pregadiene-3,20-dione (A) Dissolve 4 g. of 6$\beta$-chloro-16-methylene-4-pregnene-7$\alpha$,17$\alpha$-diol-3,20-dione 7,17-diacetate in 80 ml. of chloroform (pretreated over calcium chloride). Add gaseous hydrogen chloride for one hour, then stir the reaction mixture for 21 hours at room temperature. Wash the chloroform solution with water until the water extracts are neutral. Dry the chloroform solution over magnesium sulfate, filter and evaporate to an oily residue. Add ethyl ether and filter the resultant precipitate comprising 6 - chloro-16-methylene-17$\alpha$-acetoxy-4,6-pregnadiene-3,20-dione, M.P. 196° C., $\alpha_D^{25}$ −136° (1% dioxane);

$\lambda_{max.}^{methanol}$ 285 m$\mu$ $\epsilon$ = 22,300. Yield = 2.97 g. (85% theory)

(B) Dissolve 38 g. of 6$\beta$-chloro-16-methylene-4-pregnene-7$\alpha$,17$\alpha$-diol-3,20-dione diacetate in 760 ml. of dry chloroform at room temperature. Pass dry hydrogen chloride gas into the reaction mixture for one hour at room temperature, then stir for an additional 3.5 hours. The course of the reaction is followed by ultraviolet spectroscopic evaluation of aliquots of the reaction mixture taken at intervals. After two hours (one hour after hydrogen chloride addition) the reaction is essentially complete. Isolate the product by adding water to the reaction mixture, stirring for 15 minutes, separating the chloroform solution, washing the chloroform solution with water followed by aqueous sodium bicarbonate solution and finally with water, then drying the chloroform over magnesium sulfate and concentrating to a small volume. Add methanol to this residue and concentrate the crystal slurry to 100 ml. Collect the resultant solid by filtration, wash with cold methanol and dry at 110° C. to yield 6-chloro-16-methylene - 17$\alpha$ - acetoxy - 4,6 - pregnadiene-3,20-dione, M.P. 200° C.; $\alpha_D^{25}$ −135.7° (1% dioxane); yield 27.0 g. (80% theory).

EXAMPLE 7

6-chloro-16-methylene-17$\alpha$-hydroxy-4,6-pregnadiene-3,20-dione

To a suspension of 1.0 g. of 6$\beta$-chloro-7$\alpha$,17$\alpha$-dihydroxy-16-methylene-4-pregnene-3,20-dione in 20 ml. of chloroform (pretreated over calcium chloride) add gaseous hydrogen chloride at 25° C. until the solution is saturated. Stir the reaction mixture at 25° C. for 19 hours, then filter the insoluble material, wash the insoluble material with methylene chloride and dry to yield 550 mg. (55%) of the starting compound, i.e. 6$\beta$-chloro-17$\alpha$,17$\alpha$-dihydroxy-16-methylene-4-pregnene-3,20-dione.

Dilute the chloroform filtrate to 200 ml. with methylene chloride, wash to neutrality with water, dry over magnesium sulfate and evaporate to a residue. Purify the residue via thick layer chromatography utilizing as solvent system chloroform/ethyl acetate (9:1) and extracting with methylene chloride/acetone (1:1). Concentrate the extract to a residue comprising 116 mg. of a mixture containing 6-chloro-16-methylene-17$\alpha$-hydroxy-4,6-pregnadiene-3,20-dione as identified by thin layer chromatography, infrared and ultraviolet analysis. Purify by recrystallization from methanol to obtain 30 mgm. (3.1% theory) of 6-chloro-16-methylene-17$\alpha$-hydroxy-4,6-pregnadiene-3,20-dione as determined by infrared and ultraviolet analysis.

$UV = \lambda_{max.}^{methanol}$ 285 m$\mu$ $\epsilon$ = 21,490

We claim:

1. The process for preparing 6-chloro-16-methylene-17$\alpha$-lower alkanoyloxy-4,6-pregnadiene-3,20-dione which comprises the steps of reacting 6$\alpha$,7$\alpha$;16$\alpha$,17$\alpha$-bis-oxido-16$\beta$-methyl-4-pregnene-3,20-dione with hydrogen chloride in a non-reactive organic solvent; reacting the thereby formed 6$\beta$-chloro-7$\alpha$,17$\alpha$-dihydroxy - 16 - methylene-4-pregnene-3,20-dione with a lower alkanoic acid and an acid anhydride under acidic conditions; and reacting the thereby formed 6$\beta$-chloro-7$\alpha$,17$\alpha$-dilower alkanoyloxy-16-methylene-4-pregnene-3,20-dione with anhydrous hydrogen chloride in a non-reactive organic solvent.

2. The process of claim 1 wherein said lower alkanoyloxy is acetoxy and said lower alkanoic acid is acetic acid; said process for preparing 6-chloro-16-methylene-17$\alpha$-acetoxy-4,6-pregnadiene-3,20-dione comprising reacting 6$\alpha$,7$\alpha$;16$\alpha$,17$\alpha$-bis-oxido - 16$\beta$ - methyl-4-pregnene - 3,20-dione with hydrogen chloride in a non-reactive organic solvent; reacting the thereby formed 6$\beta$-chloro-7$\alpha$,17$\alpha$-dihydroxy-16-methylene-4-pregnene-3,20-dione with acetic acid and an acid anhydride under acidic conditions, and reacting the thereby formed 6$\beta$-chloro-7$\alpha$,17$\alpha$-diacetoxy-16-methylene-4-pregnene-3,20-dione with anhydrous hydrogen chloride in a non-reactive organic solvent.

3. The process of claim 1 wherein said lower alkanoyloxy is acetoxy, said non-reactive organic solvent in the first step is glacial acetic acid, said lower alkanoic acid and an acid anhydride under acidic conditions is acetic acid in the presence of p-toluenesulfonic acid and trifluoroacetic anhydride, and said non-reactive organic solvent in the last step is chloroform; said process for preparing 6-chloro-16-methylene-17$\alpha$-acetoxy-4,6-pregnadiene-3,20-dione comprising reacting 6$\alpha$,7$\alpha$;16$\alpha$,17$\alpha$-bis-oxido-4-pregnene-3,20-dione with hydrogen chloride in glacial acetic acid; reacting the thereby formed 6$\beta$-chloro-7$\alpha$,17$\alpha$-dihydroxy-16-methylene - 4-pregnene - 3,20-dione with acetic acid in the presence of p-toluenesulfonic acid and trifluoroacetic anhydride; and reacting the thereby formed 6$\beta$-chloro-7$\alpha$,17$\alpha$-diacetoxy-16 - methylene-4 - pregnene-3,20-dione with anhydrous hydrogen chloride in chloroform.

4. The process of claim 1 wherein said lower alkanoyloxy is acetoxy, said non-reactive organic solvent in the first step is glacial acetic acid, said lower alkanoic acid and an acid anhydride under acid conditions is acetic acid together with acetic anhydride and p-toluenesulfonic acid, and said non-reactive organic solvent in the last step is chloroform; said process for preparing 6-chloro-16-methylene-17$\alpha$-acetoxy-4,6-pregnadiene-3,20-dione comprising reacting 6$\alpha$,7$\alpha$;16$\alpha$,17$\alpha$-bis-oxido-4-pregnene-3,20-dione with hydrogen chloride in glacial acetic acid; reacting the thereby formed 6$\beta$-chloro-7$\alpha$,17$\alpha$-dihydroxy-16-methylene-4-pregnene-3,20-dione with acetic anhydride and p-toluenesulfonic acid in acetic acid; and reacting the thereby formed 6$\beta$-chloro-7$\alpha$,17$\alpha$-diacetoxy-16-methylene-4-pregnene-3,20-dione with anhydrous hydrogen chloride in a non-reactive organic solvent.

5. The process according to claim 1 wherein said non-reactive organic solvent in the last step is chloroform.

6. The process according to claim 1 wherein said non-reactive organic solvent in the last step is chloroform and said hydrogen chloride is bubbled through said chloroform solution for one hour at room temperature and the resultant reaction mixture is stirred at room temperature until deactoxylation is complete.

7. The process according to claim 1 wherein non-reactive organic solvent in the first step is glacial acetic acid and wherein said hydrochloric acid is in amounts of at least two moles per mole of 6$\alpha$,7$\alpha$;16$\alpha$,17$\alpha$-bis-oxido-16$\beta$-methyl-4-pregnene-3,20-dione.

8. The process according to claim 1 wherein said lower alkanoyloxy is acetoxy, said non-reactive organic solvent in the first step is glacial acetic acid and wherein said hydrogen chloride is in amounts of at least two moles per mole of 6α,7α;16α,17α-bis-oxido-16β-methyl-4-pregnene-3,20-dione; wherein said lower alkanoic acid and an acid anhydride under acidic conditions is acetic acid and trifluoroacetic anhydride in the presence of p-toluenesulfonic acid, said acetic acid being present in a large molar excess with respect to the 6β-chloro-7α,17α-dihydroxy-16-methylene-4-pregnene-3,20-dione; and wherein said non-reactive organic solvent in the last step is chloroform and said hydrogen chloride is bubbled through said chloroform solution for one hour at room temperature and the resultant reaction mixture is stirred at room temperature until deacetoxylation is complete;

said process for preparing 6-chloro-16-methylene-17α-acetoxy-4,6-pregnadiene-3,20-dione comprising reacting 6α,7α;16α,17α-bis-oxido-16β-methyl-4-pregnene-3,20-dione with hydrogen chloride in glacial acetic acid, said hydrogen chloride being present in amounts greater than two moles per mole of said 6α,7α;16α,17α-bis-oxido-16β-methyl-4-pregnene-3,20-dione;

reacting the thereby formed 6β-chloro-7α,17α-dihydroxy-16-methylene-4-pregnene-3,20-dione with acetic acid in the presence of p-toluenesulfonic acid and trifluoroacetic anhydride, said acetic acid being present in a large molar excess with respect to the 6β-chloro-7α,17α-dihydroxy-16-methylene-4-pregnene-3,20-dione;

reacting the thereby formed 6β-chloro-7α,17α-diacetoxy-16-methylene-4-pregnene-3,20-dione with anhydrous hydrogen chloride in chloroform, said hydrogen chloride being bubbled through said chloroform solution for one hour at room temperature and the resultant reaction mixture then stirred at room temperature until deacetoxylation is complete.

9. The reaction of claim 8 including the step of isolating the 6-chloro-16-methylene-17α-acetoxy-4,6-pregnadiene-3,20-dione thereby formed.

10. The process according to claim 1 wherein said lower alkanoyloxy is acetoxy; said non-reactive organic solvent in the first step is glacial acetic acid and wherein said hydrogen chloride is in amounts of at least two moles per mole of 6α,7α;16α,17α-bis-oxido-16β-methyl-4-pregnene-3,20-dione; wherein said lower alkanoic acid and an anhydride under acidic conditions is acetic acid together with acetic anhydride and p-toluenesulfonic acid; and wherein said non-reactive organic solvent in the last step is chloroform and said hydrogen chloride is bubbled through said chloroform solution for one hour at room temperature and the resultant reaction mixture is stirred at room temperature until deacetoxylation is complete;

said process for preparing 6-chloro-16-methylene-17α-acetoxy-4,6-pregnadiene-3,20-dione comprising reacting 6α,7α;16α,17α-bis-oxido-16β-methyl-4-pregnene-3,20-dione with hydrogen chloride in glacial acetic acid, said hydrogen chloride is present in amounts of at least two moles per mole of said 6α,7α;16α,17α-bis-oxido-16β-methyl-4-pregnene-3,20-dione;

reacting the thereby formed 6β-chloro-7α,17α-dihydroxy-16-methylene-4-pregnene-3,20-dione with acetic anhydride and p-toluenesulfonic acid in acetic acid;

reacting the thereby formed 6β-chloro-7α,17α-diacetoxy-16-methylene-4-pregnene-3,20-dione with anhydrous hydrogen chloride in chloroform, said hydrogen chloride being bubbled through said chloroform solution for one hour at room temperature and the resultant reaction mixture then stirred at room temperature until deacetoxylation is complete.

11. The process of claim 10 including the step of isolating the 6-chloro-16-methylene-17α-acetoxy-4,6-pregnadiene-3,20-dione thereby formed.

References Cited
UNITED STATES PATENTS 3,284,476  11/1966  Kincl _____ 260—397.4

LEWIS GOTTS, Primary Examiner

E. G. LOVE, Assistant Examiner

U.S. Cl. X.R.

260—239.55, 397.3

PO-1050
(5/69)

UNITED STATES PATENT OFFICE
CERTIFICATE OF CORRECTION

Patent No. 3,493,588　　　　　　　　　Dated February 3, 1970

Inventor(s) H. L. Herzog, E. L. Shapiro and L. Weber

It is certified that error appears in the above-identified patent and that said Letters Patent are hereby corrected as shown below:

Column 3, line 37, "17α-hydroxypregnenolone-α-3-formate" should read ---17α-hydroxypregnenolone 3-formate---. Column 3, line 43, "17α-acetoxypregnenolone-α-3-formate" should read ---17α-acetoxypregnenolone 3-formate---. Column 3, line 68, "-16-methylehe-" should read --- -16-methylene- ---. Column 6, line 50, ";16α17β-bis-oxido-" should read ---;16α,17α-bis-oxido- --- Column 6, line 54, "4,6-pregadiene-" should read --- -4,6-pregnadiene- ---. Column 9, line 16, "$\alpha_D$" should read ---$\underline{\alpha}\rceil_D$---. Column 9, line 37 "(sinter 157°C.)" should read ---(sinter$\underline{s}$ 157°C)---. Column 9, line 37, "$\alpha_D$" should read ---$\underline{\alpha}\rceil_D$---. Column 9, line 60, "16β-methy-" should read ---16β-methyl- ---. Column 9, line 61, "$\alpha_D$" should read ---$\underline{\alpha}\rceil_D$---. Column 10, line 48, "$\alpha_D^{25}$" should read ---$\underline{\alpha}\rceil_D^{25}$---. Column 10, line 67, "$\alpha_D^{25}$" should read ---$\underline{\alpha}\rceil_D^{25}$---. Column 11, line 4, "18 liters of water" should read ---8 liters of water---. Column 11, line 27, "$\alpha_D^{25}$" should read ---$\underline{\alpha}\rceil_D^{25}$---. Column 11, line 50, "$\alpha_D^{25}$" should read ---$\underline{\alpha}\rceil_D^{25}$---. Column 11, line 64, "-17α,17α-" should read --- -7α,17α- ---. Claim 6, column 12, line 70, "deactoxylation" should read ---deacetoxylation---.

SIGNED AND
SEALED

JUL 7 1970

(SEAL)
Attest:

Edward M. Fletcher, Jr.
Attesting Officer

WILLIAM E. SCHUYLER, JR.
Commissioner of Patents